US010773557B1

(12) United States Patent
Mast et al.

(10) Patent No.: US 10,773,557 B1
(45) Date of Patent: Sep. 15, 2020

(54) SYSTEM AND METHOD FOR USING IMAGE DATA TO DETERMINE TIRE QUALITY

(71) Applicant: STATE FARM MUTUAL AUTOMOBILE INSURANCE COMPANY, Bloomington, IL (US)

(72) Inventors: Joshua M. Mast, Bloomington, IL (US); Sharon Gibson, Carlock, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 162 days.

(21) Appl. No.: 15/598,945

(22) Filed: May 18, 2017

(51) Int. Cl.
*B60C 11/24* (2006.01)
*G01M 17/02* (2006.01)
*G01N 21/95* (2006.01)
*G06T 7/00* (2017.01)

(52) U.S. Cl.
CPC .......... *B60C 11/246* (2013.01); *G01M 17/02* (2013.01); *G01N 21/95* (2013.01); *G06T 7/001* (2013.01); *G06T 7/0008* (2013.01)

(58) Field of Classification Search
CPC ..... G01M 17/02; G01N 21/95; G06T 7/0008; G06T 7/001
See application file for complete search history.

(56) References Cited

U.S. PATENT DOCUMENTS

| | | | | |
|---|---|---|---|---|
| 5,245,867 A * | 9/1993 | Sube | ...................... | G01B 11/22 73/146 |
| 6,034,676 A * | 3/2000 | Egan | ...................... | G01B 21/18 701/31.4 |
| 6,069,966 A * | 5/2000 | Jones | ...................... | G01B 11/22 382/100 |
| 8,171,783 B2 * | 5/2012 | Tracy | ..................... | G01M 17/02 73/146 |
| 8,621,919 B2 * | 1/2014 | Pingel | ................... | B60C 11/246 73/146 |
| 9,805,697 B1 * | 10/2017 | Dorrance | ................. | G09G 5/40 |
| 10,078,892 B1 * | 9/2018 | Wang | ..................... | G06T 7/001 |
| 2002/0036039 A1 * | 3/2002 | Shimura | ................. | B60C 11/24 152/154.2 |
| 2010/0180676 A1 * | 7/2010 | Braghiroli | ........... | G01M 17/027 73/146 |
| 2012/0246036 A1 * | 9/2012 | Marr | .................. | G06Q 30/0601 705/27.1 |
| 2013/0158777 A1 * | 6/2013 | Brauer | ................... | G06Q 10/20 701/31.4 |

(Continued)

*Primary Examiner* — Ramsey Refai
(74) *Attorney, Agent, or Firm* — Marshall, Gerstein & Borun LLP

(57) ABSTRACT

A computer-implemented method for identifying whether tread of a tire of a vehicle is insufficient is presented. Image data corresponding to at least one image of the tire of the vehicle may be captured using an image sensor. The image data may be processed to determine at least one indication of a tread wear of the tire. At least one of the at least one indication of the tread wear may be analyzed based on tread wear data corresponding to the tire, with the tire being of a particular type. The tread wear data corresponding to the tire may be available to one or more processors that perform the analyzing from a provider of tires of the particular type. Based on the analyzing of the at least one of the at least one indication of the tread wear, it may be identified whether the tread of the tire is insufficient.

19 Claims, 6 Drawing Sheets

(56) References Cited

U.S. PATENT DOCUMENTS

2014/0232852 A1\* 8/2014 Nobis .................... G01N 21/95
                                                        348/128
2016/0343126 A1\* 11/2016 Miller ................... G06T 7/0006
2017/0084015 A1\* 3/2017 Rhoades ............... G06T 7/0002

\* cited by examiner

SYSTEM AND METHOD FOR USING IMAGE DATA TO DETERMINE TIRE QUALITY

FIELD OF THE DISCLOSURE

The present disclosure generally relates to determining tire quality and, more particularly, to a system and method for using image data to determine tire quality.

BACKGROUND

Conventional techniques for determining tire quality, such as whether tread of a vehicle tire is sufficient or is too worn, include evaluating the tread using an object such as a penny and determining how much of the penny is obscured by the tread. Such techniques are prone to errors in determining whether enough of the penny is obscured by the tread. Some such errors may result from not accounting for the fact that different amounts of tread are considered sufficient for different types of tires. Conventional techniques for determining tire quality have various other drawbacks as well.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a computer-implemented method for identifying whether tread of a tire of a vehicle is insufficient may be provided. The method may include capturing, using an image sensor, image data corresponding to at least one image of the tire of the vehicle. The method may also include processing, using one or more processors of a user computing device, the image data to determine at least one indication of a tread wear of the tire. The method may additionally include analyzing, using the one or more processors of the user computing device, at least one of the at least one indication of the tread wear based on tread wear data corresponding to the tire. The tire may be of a particular type, and the tread wear data corresponding to the tire may be available to the one or more processors of the user computing device from a provider of tires of the particular type. The method may further include identifying, using the one or more processors of the user computing device based on the analyzing of the at least one of the at least one indication of the tread wear, whether the tread of the tire is insufficient.

In another embodiment, a computing device for identifying whether tread of a tire of a vehicle is insufficient may be provided. The computing device may include an image sensor configured to capture image data corresponding to at least one image of the tire of the vehicle. The computing device may also include one or more processors and one or more memories coupled to the one or more processors. The one or more memories may include non-transitory computer executable instructions stored therein that, when executed by the one or more processors, cause the one or more processors to process the image data to determine at least one indication of a tread wear of the tire. The non-transitory computer executable instructions, when executed by the one or more processors, may also cause the one or more processors to analyze at least one of the at least one indication of the tread wear based on tread wear data corresponding to the tire. The tire may be of a particular type, and the tread wear data corresponding to the tire may be available to the one or more processors from a provider of tires of the particular type. The non-transitory computer executable instructions, when executed by the one or more processors, may additionally cause the one or more processors to identify, based on the analyzing of the at least one of the at least one indication of the tread wear, whether the tread of the tire is insufficient.

In yet another embodiment, a computer readable storage medium may be provided that includes non-transitory computer readable instructions stored thereon for identifying whether tread of a tire of a vehicle is insufficient. The instructions, when executed by one or more computing devices, may cause the one or more computing devices to capture, using an image sensor, image data corresponding to at least one image of the tire of the vehicle. The instructions, when executed by the one or more computing devices, may also cause the one or more computing devices to process the image data to determine at least one indication of a tread wear of the tire. The instructions, when executed by the one or more computing devices, may additionally cause the one or more computing devices to analyze at least one of the at least one indication of the tread wear based on tread wear data corresponding to the tire. The tire may be of a particular type, and the tread wear data corresponding to the tire may be available to the one or more computing devices from a provider of tires of the particular type. The instructions, when executed by the one or more computing devices, may further cause the one or more computing devices to identify, based on the analyzing of the at least one of the at least one indication of the tread wear, whether the tread of the tire is insufficient.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

Figure 1:
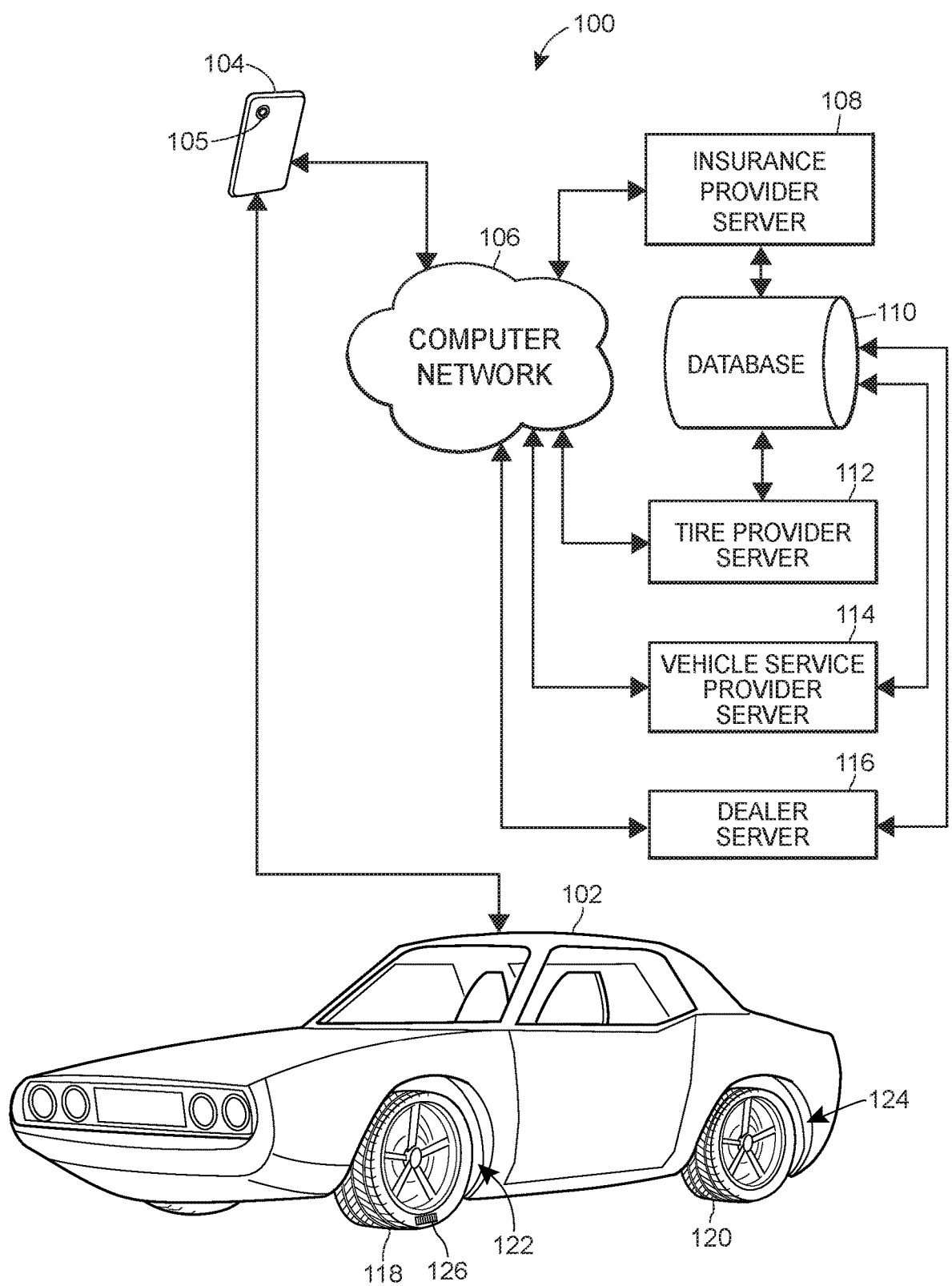
FIG. 1 illustrates an example system for using image data to determine tire quality.

The figures depict various aspects of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, the patent claims at the end of this patent application are not intended to be construed under 35 U.S.C. § 112(f) unless traditional means-plus-function language is expressly recited, such as "means for" or "step for" language being explicitly recited in the claim(s).

I. Example Using of Image Data to Determine Tire Quality

The present embodiments relate to, inter alia, systems and methods for using image data to determine tire quality (e.g., to identify whether tread of a tire is sufficient, to identify whether a tire/wheel misalignment is present, etc.). For example, and as further described below, the systems and methods described herein allow an identification of whether tread of a vehicle tire is insufficient using a user computing device that has access to captured image data corresponding to the tire, and that further has access to tread wear data corresponding to the particular type (e.g., brand, name of tire manufacturer or other provider, etc.) of the tire as made available by a tire provider (e.g., manufacturer or other provider, such as a reseller). By allowing captured image data corresponding to the tire (e.g., corresponding to an image(s) of the tire) and tread wear data corresponding to the particular type of the tire to be made available to the user computing device, the present systems and methods allow such information to be advantageously utilized at a user computing device for analysis and identification of whether tread of the tire is insufficient. Additionally, the need to measure tread of the tire other than via the captured image data may be beneficially eliminated, and tread wear data that indicates, for example, when tread of the particular type of the tire is insufficient is beneficially made available at the user computing device for centralized analysis. In view of these and other advantages, it will be appreciated that the systems and methods described herein are directed to an improvement to computer functionality and/or an improvement in computer-related technology, and improve the functioning of conventional computers.

Other advantages will be recognized by one of ordinary skill in the art in light of the teaching and disclosure herein. Moreover, additional features and embodiments of a system and method for using image data to determine tire quality are further described below.

II. Example System and Related Functionality for Using Image Data to Determine Tire Quality FIG. 1 illustrates an example system 100 for using image data to determine tire quality. The example system 100 may include a vehicle 102 and a user computing device 104 (which is shown as a mobile phone, but may be any suitable computing device of a user of functionality of the example system 100 described herein). As shown in the example of FIG. 1, the user computing device 104 may include an image sensor, such as a camera 105, which may be used to capture image data corresponding to at least one image of a tire of the vehicle 102, and in some embodiments at least one image of identifying indicium or indicia thereof (e.g., a bar code), as further discussed below. As such, the user computing device 104 and the vehicle 102 are shown as being communicatively coupled to and from one another in FIG. 1. It should be appreciated that the user computing device 104 may also or alternatively be configured to determine image data and/or other suitable identifying information associated with the vehicle 102 (or portion(s) thereof, such as a tire or tires of the vehicle 102) in a manner other than via use of the image sensor (e.g., camera 105), such as via suitable user input.

As shown in FIG. 1, the example system 100 may further include a computer network 106, an insurance provider server 108, a database 110, a tire provider server 112, a vehicle service provider server 114, and a dealer server 116. The vehicle 102 may be any suitable type of vehicle, such as a sedan, a truck, a motorcycle, a two-door car, etc. In the particular example of FIG. 1, the vehicle 102 is a two-door car. As such, the vehicle 102 may have, for example, four wheels and four tires. In the example of FIG. 1, a left front tire 118 and a left rear tire 120 of the vehicle 102 are visible. The left front wheel holding the left front tire 118 may have an associated left front wheel well 122, and the left rear wheel holding the left rear tire 120 may have an associated left rear wheel well 124. In some embodiments, and as shown in the example of FIG. 1, the left front tire 118 may have a bar code 126 thereon, and/or may include other suitable identifying indicium or indicia (not shown) thereon or associated therewith. While tire tread is not designated with reference numerals in the example of FIG. 1, FIG. 1 illustrates portions of tire tread on each of the left front tire 118 and the left rear tire 120, and techniques for, inter alia, identifying sufficient and/or insufficient tire tread (including utilization of the bar code 126) are discussed in detail below.

The insurance provider server 108 may be a server of or associated with an insurance provider (e.g., provided or used by an insurance provider, or use of which the insurance provider otherwise controls or facilitates). The insurance provider may be associated with the vehicle 102. For example, the insurance provider may be associated with the vehicle 102 because a prospective purchaser of the vehicle 102 may apply for insurance coverage for the vehicle 102 from the insurance provider, and/or because an owner of the vehicle 102 may already have insurance coverage for the vehicle 102 from the insurance provider.

The database 110 may store, for example, the image data captured by the image sensor (e.g., camera 105); one or more indications of tread wear of a tire or tires (e.g., the left front tire 118), such as one or more measurements of tread depth of the tire or tires; tread wear data corresponding to the tire, which may be made available by a tire provider as discussed herein; and/or one or more indications of whether the tread wear of the tire or tires has been identified as insufficient (e.g., corresponding to a tread depth less than a minimum sufficient tread depth), etc. The database 110 may be communicatively coupled to, for example, the insurance provider server 108, the tire provider server 112, the vehicle service provider server 114, and the dealer server 116 to facilitate the storage and retrieval of information such as that discussed herein to and from the database 110. As another example, in some embodiments, the database 110 may be communicatively coupled to the user computing device 104 in a manner additional to that shown in FIG. 1. For example, instead of the user computing device 104 being communicatively coupled to the database 110 via the computer network 106 and the insurance provider server 108 (among other devices), the user computing device 104 may be directly coupled to the database 110; the computer network 106 may be directly coupled to the database 110 so that the user computing device 104 is coupled to the database 110 via the computer network 106; and/or any other suitable arrangement of devices may be implemented. In some embodiments, various example types of data described above may be stored in another suitable location or locations, such as in a further database (not shown), at the insurance provider server 108, etc. The database 110 may be any suitable database(s) or data storage mechanism(s) (e.g., one or more hard disk drives, optical storage drives, solid state storage devices, etc.).

Although the example system 100 shows one vehicle 102, one user computing device 104, one image sensor (e.g., one camera 105), one computer network 106, one insurance provider server 108, one database 110, one tire provider server 112, one vehicle service provider server 114, and one dealer server 116, the example system 100 may include more than one instance of one or more of these components. Additionally or alternatively, the example system 100 may not include one or more of the components illustrated in FIG. 1. As just one example, in one embodiment, the functionality provided by the vehicle service provider server 114 may be provided by the insurance provider server 108, and thus the vehicle service provider server 114 may not be present. Thus, it will be further understood in light of the teaching and disclosure herein that various components shown in FIG. 1 need not be implemented as physically distinct components. As just one further example, the database 110 may be implemented as suitable data storage included in, for example, the insurance provider server 108.

Furthermore, while each of the user computing device 104, the insurance provider server 108, the tire provider server 112, the vehicle service provider server 114, and the dealer server 116 is shown as being communicatively coupled to the computer network 106, other arrangements may be implemented. As one example, the user computing device 104 may be directly connected to the insurance provider server 108, the tire provider server 112, the vehicle service provider server 114, and/or the dealer server 116 (not shown as such in FIG. 1), and/or the user computing device 104 may be indirectly connected to the insurance provider server 108, the tire provider server 112, the vehicle service provider server 114, and/or the dealer server 116 via, for example, components other than the computer network 106 (not shown in FIG. 1).

Still further, it will be appreciated from the teaching and disclosure herein that one or more components of the example system 100 may, in various embodiments, not perform or implement one or more actions described herein with respect to such component(s). As such, in various embodiments, one or more components of the example system 100 may be configured to perform various actions, but may perform less than all of such various actions.

Figure 2:
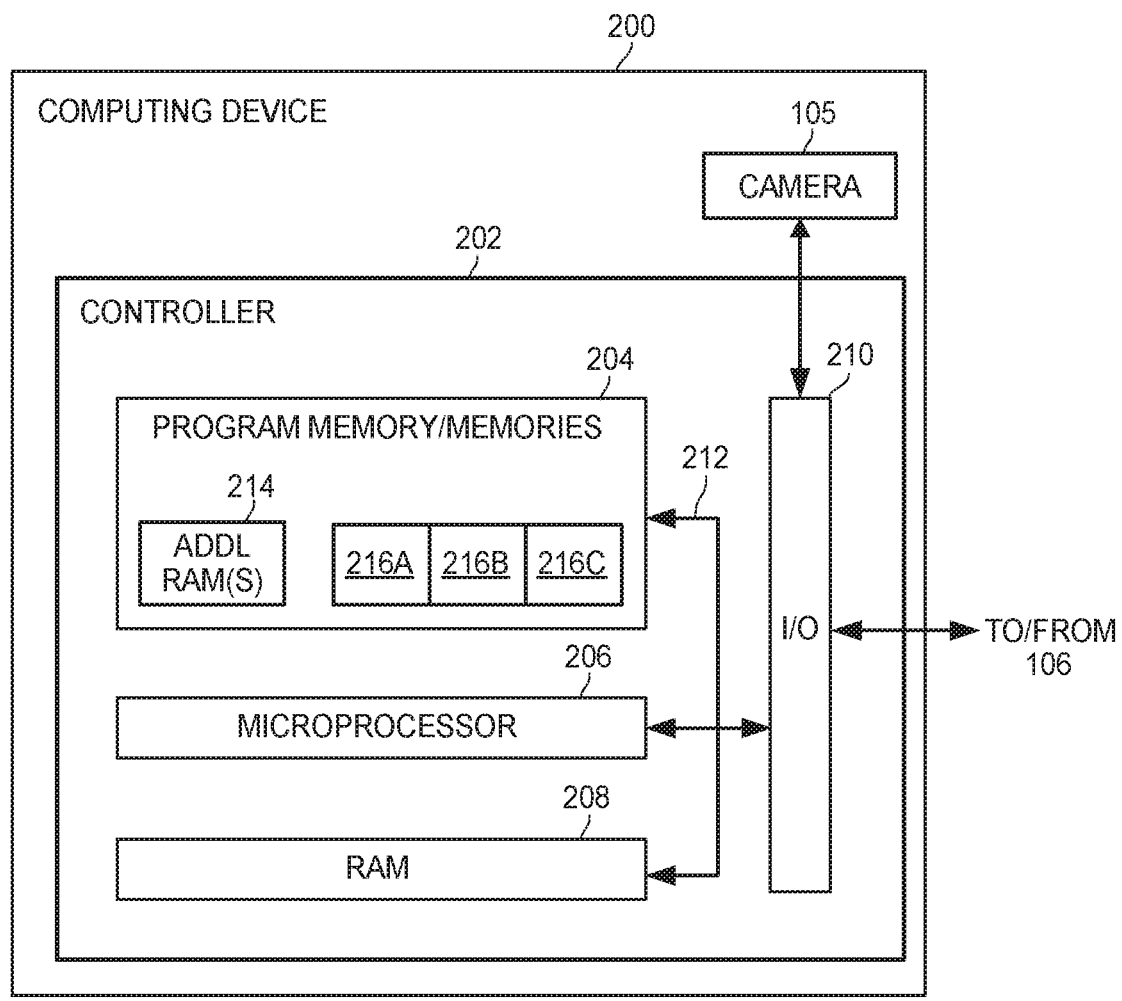
FIG. 2 illustrates an example computing device and components thereof.

Referring now to FIG. 2, an example computing device 200 and components thereof are illustrated. The example computing device 200 and components thereof may be used in implementing, for example, one or more of the user computing device 104, the insurance provider server 108, the tire provider server 112, the vehicle service provider server 114, and/or the dealer server 116. In the example shown in FIG. 2, the computing device 200 may include the camera 105 and a controller 202. The controller 202 may include a program memory 204, a microcontroller or a microprocessor 206, a random-access memory (RAM) 208, and an input/output (I/O) circuit 210, all of which may be interconnected via an address/data bus 212. The camera 105 (e.g., when the example computing device 200 is implemented as the user computing device 104) may provide captured image data corresponding to at least one image of a tire of the vehicle 102 (e.g., the left front tire 118), and in some embodiments at least one image of the bar code 126, as further described herein, to the I/O circuit 210 for processing by, for example, the microprocessor 206. The program memory 204 may store computer-executable instructions, which may be executed by the microprocessor 206.

It should be appreciated that although FIG. 2 depicts only one microprocessor 206, the controller 202 may include multiple microprocessors 206. Similarly, the program memory 204 of the controller 202 may include additional RAM(s) 214 and multiple program memories storing, for example, modules, routines, and/or instructions for multiple corresponding applications 216A, 216B, and 216C (or any suitable number of applications), according to the particular configuration of the controller 202 and the computing device 200. Such modules, routines, and/or instructions, etc. may be used in performing various operations for using image data to determine tire quality, such as example operations as described herein.

Additionally, although FIG. 2 depicts the I/O circuit 210 as a single block, the I/O circuit 210 may include a number of different types of I/O circuits (not depicted). The RAM(s) 208, 214 and the program memory/memories storing, for example, instructions for the applications 216A, 216B and 216C, may be implemented in any known form of non-transitory computer readable storage media, including but not limited to semiconductor memories, magnetically readable memories, and/or optically readable memories. It should also be appreciated that the example computing device 200 may include additional, fewer, or alternate components.

In some embodiments, the instructions for, for example, the applications 216A, 216B, and/or 216C stored in the program memory/memories may include instructions for a mobile computing device application for execution on the user computing device 104, for example. With reference to the discussion above, the mobile computing device application may be used in performing various operations for using image data to determine tire quality. In various embodiments, the mobile computing device application may be an insured party tire quality application, and may be made available (e.g., for download via the computer network 106) by the insurance provider associated with the insurance provider server 108. For purposes of explanation, the present disclosure will at times refer to the application 216A as the insured party tire quality application (i.e., will refer to the insured party tire quality application as the insured party tire quality application 216A). In addition to the functionality described elsewhere herein, the insured party tire quality application 216A may include capabilities made available to a party (e.g., an owner of the vehicle 102) insured by the insurance provider associated with the insurance provider server 108, such as an ability of the party to view insurance policy information within the insured party tire quality application 216A; use functionality of the insured party tire quality application 216A to contact an agent of the insurance provider; use functionality of the insured party tire quality application 216A to file an insurance claim with respect to the vehicle 102; and/or any other suitable capabilities. In some embodiments, the insured party tire quality application 216A may be the Pocket Agent® app.

In various embodiments, the module(s), routine(s), and/or instruction(s) for the application(s) 216B and/or 216C may be, for example, modules, routines, and/or instructions for any other suitable applications executable by the user computing device 104. In some embodiments, the application 216B and/or the application 216C may additionally or alternatively be used in performing various operations for using image data to determine tire quality (such as the same operations for using image data to determine tire quality as described with respect to the insured party tire quality application 216A), as further described herein. For example, the application 216B and/or the application 216C, and thus the functionality described herein, may be made available by the insurance provider (e.g., for download via the computer network 106) to a party that is not insured by the insurance provider with respect to the vehicle 102.

As noted above, the user computing device 104 (which may be, for example, an implementation of the example computing device 200) may include an image sensor, such as, for example, the camera 105, to capture image data (e.g., by taking one or more photographs) corresponding to at least one image of a tire (e.g., the left front tire 118) of the vehicle 102. In some embodiments, the image data and/or additional image data captured using the image sensor (e.g., the camera 105) may also correspond to at least one image of the bar code 126 or other identifying indicium or indicia of the left front tire 118. In any event, such captured image data may be utilized in implementing the functionality of the example system 100 as further described below. For example, with further reference to the discussion above, the image sensor (e.g., the camera 105) may be in communication with the insured party tire quality application 216A by way of the I/O circuit 210 (e.g., so that captured image data may be used by the insured party tire quality application 216A, as further described below).

With further reference to FIG. 1, the user computing device 104 may be any suitable computing device, such as but not limited to a smart phone, other mobile phone, a tablet, a phablet, smart glasses, other wearable computing device(s), etc. The computer network 106 may be or may include a computer network of the insurance provider (e.g., provided or used by the insurance provider or communications over which the insurance provider otherwise controls or facilitates). In various embodiments, processors of the devices communicatively coupled to the computer network 106 may execute instructions to transmit data to, receive data from, or otherwise communicate with other ones of the devices communicatively coupled to the computer network 106, as further described below. In various embodiments, such communication may include, but not be limited to, transmitting and/or receiving data within the context of the insured party tire quality application 216A, for example. The computer network 106 may be or may include a network such as the Internet and/or any other type of suitable network (e.g., a local area network (LAN), a metropolitan area network (MAN), a wide area network (WAN), a mobile network, a wired or wireless network, a private network, a virtual private network, etc.). The computer network 106 may also or alternatively be or include one or more cellular networks such as code division multiple access (CDMA) network, GSM (Global System for Mobile Communications) network, WiMAX (Worldwide Interoperability for Microwave Access) network, Long Term Evolution (LTE) network, etc.

Figure 3:
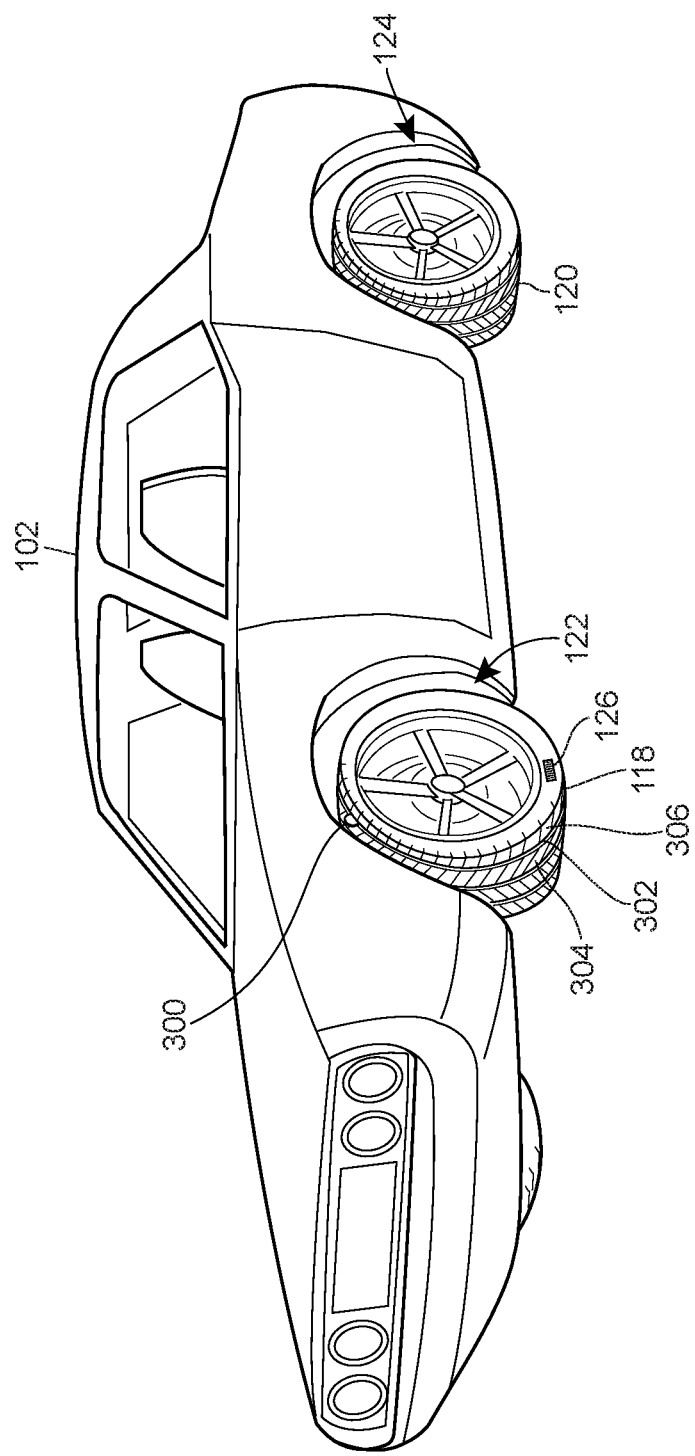
FIG. 3 illustrates a perspective view of an example vehicle, tire, associated components, and an example reference object situated in a groove between two portions of tread of the tire.

III. Example Determination and Analysis of Indication(S) of Tread Wear Using Image Data of Tire FIG. 3 illustrates a perspective view of the vehicle 102, the left front tire 118, the left rear tire 120, the left front wheel well 122, the left rear wheel well 124, and the bar code 126. FIG. 3 also illustrates, on the left front tire 118, a reference object 300 situated in a groove 302 between a first portion 304 of tread of the left front tire 118 and a second portion 306 of tread of the left front tire 118. In various embodiments, the reference object 300 may be a circular object that is held in an upright or "standing" position in the groove 302 by, for example, a party (not shown) such as the user of the user computing device 104. For example, the reference object 300 may be a penny or other suitable coin.

As discussed elsewhere herein, tread wear data corresponding to the particular type (e.g., brand, name of tire manufacturer or other provider, etc.) of the left front tire 118 may be made available to the user computing device 104 (e.g., to one or more processors thereof) by a provider of the left front tire 118. The tread wear data may indicate a minimum sufficient tread depth for the particular type of the left front tire 118. The reference object 300 situated in the groove 302 may be utilized in conjunction with, for example, the tread wear data and image processing techniques as further discussed herein to determine if any portion of tread of the left front tire 118 (e.g., the first portion 304 and/or the second portion 306) has a tread depth that is less than the minimum sufficient tread depth. For example, as further described with respect to, for example, FIG. 4, in some embodiments an image-data-to-reference-object ratio may be determined for the reference object 300 from the captured image data and may be utilized to make the determinations regarding sufficiency of tread depth described herein. Furthermore, in some embodiments and as further described with respect to, for example, FIGS. 4 and 5, image processing techniques such as the determination of the image-data-to-reference-object ratio for the reference object 300 may be utilized in conjunction with identifying a tire misalignment (e.g., uneven alignment of different tires of the vehicle 102).

Figure 4:
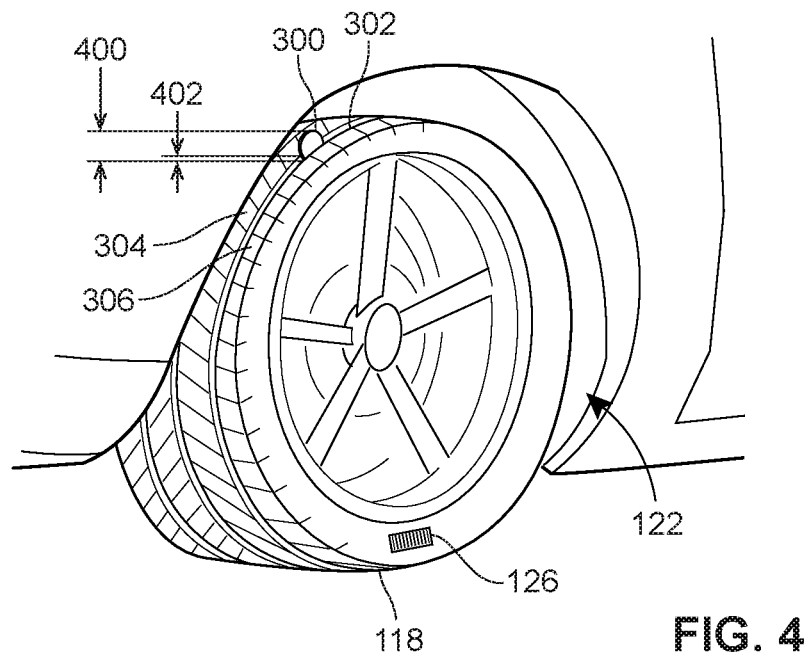
FIG. 4 illustrates a close-up perspective view of the example tire, associated components, and reference object of FIG. 3, and measurements associated with the example reference object.

FIG. 4 illustrates a close-up perspective view of the left front tire 118, the left front wheel well 122, the bar code 126, and a surrounding portion of the vehicle 102. FIG. 4 also illustrates the reference object 300 situated in the groove 302 between the first portion 304 of the tread and the second portion 306 of the tread. Furthermore, FIG. 4 illustrates a first measurement 400 of a dimension (e.g., a height, such as a diameter) of the reference object 300 and a second measurement 402 of a dimension of the first portion 304 of the tread. For example, the second measurement 402 may be of a depth of the first portion 304 of the tread, and thus may be a measurement of a distance from an outermost or "topmost" point on the first portion 304 to a "bottommost" point on the first portion 304, such as a point that coincides with the surface of the groove 302. The first measurement 400 and the second measurement 402 may be measurements in any suitable units, such as inches. It is noted that because of the perspective view of FIG. 4, the full height and/or diameter of the reference object 300 is not visible, and similarly the "bottommost" point on the first portion 304 of the tread that is discussed above with reference to the second measurement 402 is also not visible. Furthermore, it will be appreciated in light of the teaching and disclosure herein that an indication of a tread wear of a tire, such as of the left front tire 118, may be or may include a measurement of a tread depth (e.g., a measurement of a depth of a portion of the tread, such as the first portion 304), such as the second measurement 402.

In some embodiments, the first measurement 400 may be predetermined (e.g., already known), such as by way of knowledge of the diameter of a coin that is used as the reference object 300 in advance of implementing the functionality described herein. As further described herein, one or more processors of the user computing device 104 (e.g., one or more instances of the microprocessor 206) may process image data captured using, for example, the camera 105 where the captured image data includes image data corresponding to at least one image of the left front tire 118 with the reference object 300 being positioned and/or held in or near (e.g., slightly above (not shown as such in FIG. 4)) the groove 302. The processing of such captured image data may be used to determine an image-data-to-reference-object ratio between an amount of the image data that is included over the diameter of the reference object 300 (e.g., a number of pixels included over the diameter of the reference object 300) and the diameter of the reference object 300. Thus, for example, the image-data-to-reference-object ratio may be a pixel-to-diameter ratio (e.g., expressed as a pixels-to-inches ratio or expressed in any other suitable units) determined utilizing the predetermined diameter of the reference object 300.

In some embodiments, when the reference object 300 is partially obscured in an image represented by captured image data, such as in an image similar to the example perspective view in FIG. 4, a number of pixels over a height of a particular visible portion (e.g., over a height of a top half) of the reference object 300 may be determined from the image processing described herein. The determined number of pixels over the height of the particular visible portion may be divided by a corresponding fraction of the known diameter of the reference object 300, such as half of the diameter (i.e., the radius) of the reference object 300 in the example where the determined number of pixels is a number of pixels over the height of the top half of the reference object 300, to determine the pixel-to-diameter ratio described above.

In any event, the determined pixel-to-diameter ratio may be used to determine other measurements, such as tread depth measurements, in other portions of the image data based on numbers of pixels corresponding to such tread depth measurements, as further discussed below. For example, the determined pixel-to-diameter ratio may be used to determine the second measurement 402, which as discussed above may be a depth of the first portion 304 of the tread of the left front tire 118. With reference to the discussion above, the depth of the first portion 304 of the tread may constitute an indication of a tread wear of the left front tire 118, and more particularly may constitute an indication of a tread wear of the first portion 304 of the tread.

In some embodiments, the second measurement 402 may be determined from the pixel-to-diameter ratio by way of the processing of the captured image data including determination of an amount of image data corresponding to a portion of the height (e.g., diameter) of the reference object 300 that is located above a topmost point of the first portion 304 of the tread. Based on the pixel-to-diameter ratio; the amount of image data corresponding to the portion of the height (e.g., diameter) of the reference object 300 that is located above the topmost point on the first portion 304 of the tread; and the known diameter of the reference object 300, a portion of the height (e.g., diameter) of the reference object 300 that is located above the topmost portion of the first portion 304 of the tread may be determined. Because the height (e.g., diameter) of the reference object 300 may be known (e.g., predetermined) as described above, a portion of the height (e.g., diameter) of the reference object 300 that is inside the groove 302 (e.g., below a "top" of the groove 302 when a "top" of the groove 302 is considered to be a topmost point on the first portion 304 of tread) may be determined by subtracting the determined portion of the height of the reference object 300 that is located above the topmost point on the first portion 304 from the known height of the reference object 300. As will be appreciated in light of the teaching and disclosure herein, such a portion of the height of the reference object 300 that is determined to be located inside the groove 302 may constitute the depth of the first portion 304 of the tread, and thus may be the second measurement 402.

The second measurement 402 may be analyzed with respect to a minimum sufficient tread depth for the particular type of the left front tire 118, and the user computing device 104 may identify whether the tread of the left front tire 118 is insufficient. In some embodiments, if one or more portions of tread of a tire are insufficient, the tread of the tire as a whole may be identified as insufficient. Thus, for example, if the second measurement 402 is less than the minimum sufficient tread depth for the particular type of the left front tire 118, the first portion 304 of the tread may be identified as insufficient, and as a result the tread of the left front tire 118 as a whole may be identified as insufficient.

As also further discussed below, the determined image-data-to-reference-object ratio may in some embodiments be utilized to determine multiple measurements of multiple tread depths, and/or to determine multiple measurements of one tread depth of a particular portion of tread at different times. For example, the determined image-data-to-reference-object ratio may be utilized in determining the second measurement 402 of the depth of the first portion 304 of the tread, and may also be utilized in determining, for example, a further measurement (not shown in FIG. 4) of the depth of the second portion 306 of the tread in the manner described in further detail above with respect to the determination of the second measurement 402. Additionally or alternatively, the determined image-data-to-reference-object ratio may be utilized in determining the second measurement 402 of the depth of the first portion 304 of the tread at different times (e.g., performing multiple determinations of the second measurement 402, each at a different time).

In any event, such use of a further measurement or measurements and/or such use of multiple determinations of a measurement such as the second measurement 402 may be used to, among other actions, identify whether a tire misalignment is associated with the vehicle 102. For example, as further discussed below, if the second measurement 402 differs by at least a threshold or predetermined amount from the further measurement of a different tread depth, the left front tire 118 may be determined to be wearing unevenly and a tire misalignment issue may be identified accordingly. As another example, and as also further discussed below, if multiple determinations of the second measurement 402 at different times indicate that the second measurement 402 is changing by at least a threshold or predetermined amount over time and/or changing at least a threshold or predetermined rate, the left front tire 118 may be determined to be wearing unevenly or otherwise improperly and a tire misalignment issue may be identified accordingly.

Figure 5:
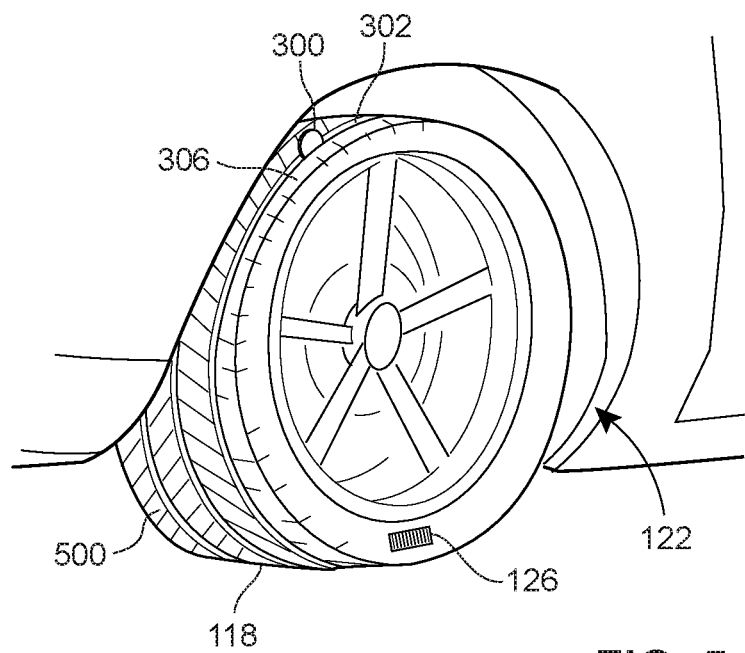
FIG. 5 illustrates another close-up perspective view of the example tire, associated components, and reference object of FIG. 3.

FIG. 5 illustrates another close-up perspective view of the left front tire 118, the left front wheel well 122, the bar code 126, and a surrounding portion of the vehicle 102. As in FIG. 4, FIG. 5 also illustrates the reference object 300 situated in the groove 302. The first portion 304 of the tread is not labeled as such in FIG. 5 for ease of illustration of additional features of FIG. 5. More particularly, FIG. 5 illustrates that a third portion 500 of the tread, which may be the innermost portion of the tread of the left front tire 118 (e.g., the innermost portion with respect to the body of the vehicle 102), may have a greater tread depth than the second portion 306 of the tread. The second portion 306 of the tread, as in FIGS. 3 and 4, may be the outermost portion of the tread of the left front tire 118 (e.g., the outermost portion with respect to the body of the vehicle 102), and in the example of FIG. 5, may be worn to a depth less than that of the third portion 500 (and less than the tread depths of other portions of the tread that are not designated with reference numerals in FIG. 5).

With continued reference to FIG. 5, the image-data-to-reference-object ratio may be used in determining a measurement of the depth of the third portion 500 of the tread in a similar manner as, for example, the determination of the second measurement 402 as described with respect to FIG. 4. For example, the reference object 300 may be placed in the groove adjacent to the third portion 500. The aforementioned pixel-to-diameter ratio; an amount of the captured image data corresponding to a portion of the height (e.g., diameter) of the reference object 300 that is located above a topmost point on the third portion 500 of the tread; and the known diameter of the reference object 300 may be utilized in a similar manner as described above to determine a portion of the height of the reference object 300 that is located inside the groove adjacent to the third portion 500 in order to determine a tread depth of the third portion 500. Similar to the discussion above regarding the second measurement 402, a "top" of the groove adjacent to the third portion 500 of the tread (for purposes of determining the portion of the height of the reference object 300 that is located "inside" the groove (e.g., below the "top" of the groove)) may be considered to correspond to a topmost point on the third portion 500 of the tread.

As discussed above and as further discussed below, a determination that the tread depth of the third portion 500 of the tread is greater than the tread depth of the second portion 306 of the tread by, for example, at least a threshold or predetermined amount may indicate uneven wear of the left front tire 118, which in turn may indicate a tire misalignment associated with the vehicle 102. In some embodiments, and as further discussed below, a tire misalignment associated with the vehicle 102 may also or alternatively be identified when a difference between a tread depth of one portion (e.g., the third portion 500) and a tread depth of another portion (e.g., the second portion 306) increases by at least a threshold or predetermined amount over time and/or changes at at least a threshold or predetermined rate.

Accordingly, among other advantages of the described embodiments, insufficient tread depth of the left front tire 118 and/or a tire misalignment associated with the vehicle 102 may be determined by capturing image data corresponding to a single image or, in some cases, multiple images of the left front tire 118, and by processing and analyzing the captured image data as described herein. A single image may include, for example, the reference object 300 inserted in a groove (e.g., the groove 302) adjacent to the portion or portions of tread for which tread depth is to be determined, and the captured image data may be processed to determine one or more indications of tread wear and more particularly, in some embodiments, one or more measurements of tread depth. Thus, image data corresponding to a single image may be used to determine multiple measurements of tread depth if desired, and such multiple measurements of tread depth may, for example, improve the accuracy of the insured party tire quality application 216A in identifying insufficient tread of the left front tire 118 and/or in identifying a tire misalignment associated with the vehicle 102.

In other embodiments, if desired, image data corresponding to multiple images of the left front tire 118 may be captured at different times, such as when the reference object 300 is to be placed in different grooves to measure various tread depths as further discussed with respect to, for example, FIG. 5. In still other embodiments, image data corresponding to multiple images of the left front tire 118 may also or alternatively be captured at different times by capturing image data used to determine the pixel-to-diameter ratio at a different time from when image data used to determine a tread depth measurement(s) is captured; by capturing image data used to determine a tread depth measurement(s) at distinct times as discussed elsewhere herein; and/or by capturing image data at different times for any other suitable use. In some embodiments, after identifying whether the left front tire 118 has insufficient tread and/or identifying whether a tire misalignment is associated with the vehicle 102 from captured image data as described herein, the insured party tire quality application 216A may prompt a user to capture image data corresponding to one or more additional images of the left front tire 118 for further analysis. For example, such further analysis may include a determination(s) of tread depth(s) based on image data corresponding to an image(s) of the left front tire 118 captured from a different angle(s).

Figure 6:
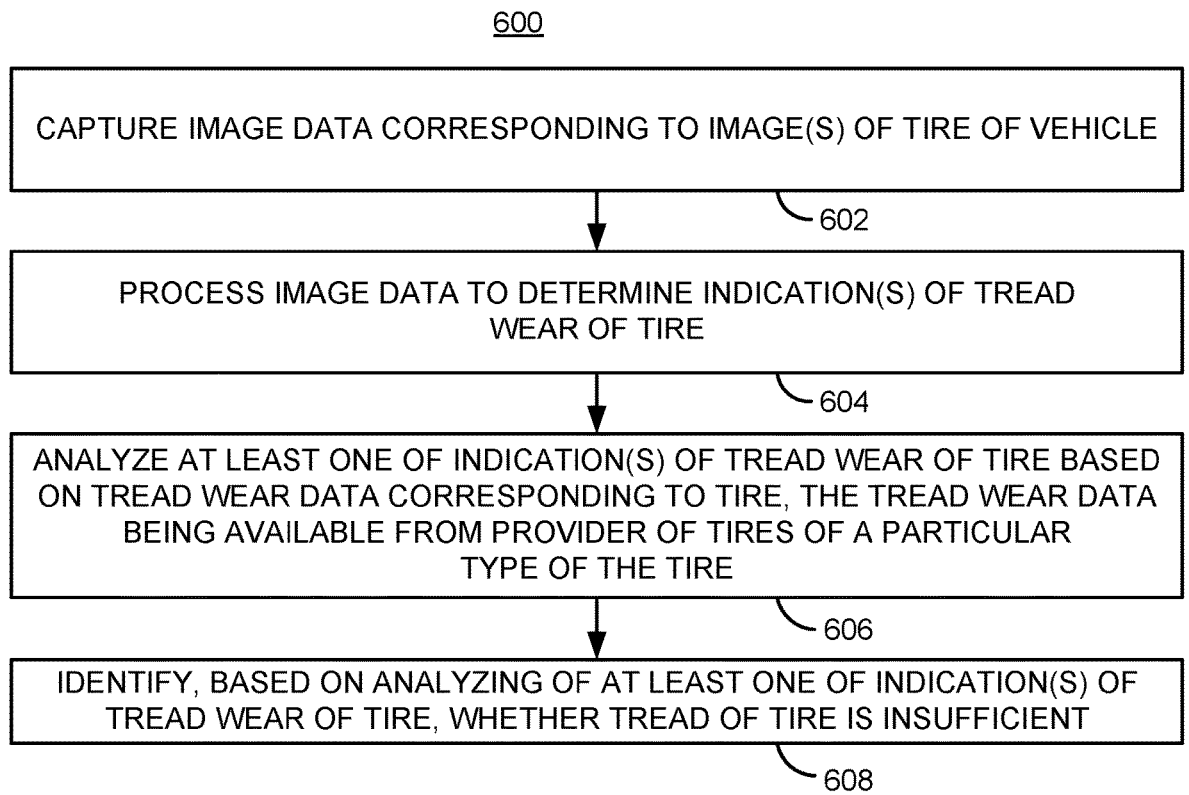
FIG. 6 is a flow chart of an example method, routine, or process for using image data to determine tire quality.

IV. Example Methods for Identifying Insufficient Tire Tread and/or Tire Misalignment FIG. 6 is a flow chart of an example method, routine, or process 600 for using image data to determine tire quality. More particularly, the example method, routine, or process 600 may be a method, routine, or process for identifying whether tread of a tire of a vehicle (e.g., tread of the left front tire 118 of the vehicle 102) is insufficient. It will be appreciated in light of the teaching and disclosure herein that although various example functionality is described with respect to, generally speaking, determining a quality of the left front tire 118 of the vehicle 102, a quality (e.g., identification of sufficiency of tread and/or identification of whether tire misalignment exists) of or associated with any suitable tire(s) (e.g., the left rear tire 120, another tire of the vehicle 102, etc.) may be determined as described herein.

Image data corresponding to at least one image of the left front tire 118 of the vehicle 102 may be captured using an image sensor (block 602). The image sensor may be, for example, the camera 105 or any other suitable image sensor. As described above with respect to, for example, FIG. 5, the image data may correspond to a single image of the left front tire 118 including, for example, the reference object 300, or may correspond to multiple images of the left front tire 118. For example, the multiple images of the left front tire 118 may be multiple images of the left front tire 118 at different times, such as times when the reference object 300 is and is not placed in the groove 302; different times after the left front tire 118 has been used in driving of the vehicle 102 in order to show tread wear (and determine tread depth) over time; and/or any other suitable different times. Example uses of multiple images of the left front tire 118 at different times are further discussed elsewhere herein.

In various embodiments, suitable instructions may be presented to a user of the user computing device 104 regarding positioning of the image sensor (e.g., camera 105) and the left front tire 118 in order to capture the image data. In some examples, such instructions may also indicate proper positioning of the reference object 300. The instructions may more particularly be presented to the user via, for example, the insured party tire quality application 216A, and may be or include audio instructions; visual instructions such as words visible via a user interface of the user computing device 104; visual instructions such as a picture and/or on-screen visual guide that indicates in any suitable manner when the image sensor, left front tire 118, and/or reference object are correctly positioned for image data capture; and/or any other suitable instructions. In some embodiments, the instructions may also indicate details of an object that is to be used as the reference object 300, such as a particular size of the reference object 300 that is to be used; a particular type of coin that is to be used as the reference object 300; and/or any other suitable details.

One or more processors, which may be one or more processors of the user computing device 104, such as a microprocessor(s) implemented as described above with respect to FIG. 2, may process the image data to determine at least one indication of a tread wear of the left front tire 118 (block 604). With reference to the discussion above, in various embodiments, the at least one indication of the tread wear of the left front tire 118 may be or may include at least one measurement of tread depth of the left front tire 118, and more particularly at least one measurement of depth of a portion of tread of the left front tire 118. In one example, and as discussed with respect to FIGS. 4 and 5, the at least one indication of the tread wear of the left front tire 118 may include the second measurement 402 of the depth of the first portion 304 of the tread and may also include measurements of the depths of the second portion 306 and the third portion 500 of the tread. With further reference to the discussion elsewhere herein, in various embodiments, the at least one indication of the tread wear of the left front tire 118 may be multiple indications of tread wear (e.g., measurements of tread depth) of a single portion of tread at different times; multiple indications of tread wear of multiple portions of tread (e.g., multiple indications of tread wear at different locations on the left front tire 118) at the same time (e.g., as indicated by image data corresponding to the same image); multiple indications of tread wear of multiple portions of tread at different times; etc.

The one or more processors may analyze at least one of the at least one indication of the tread wear of the left front tire 118 based on tread wear data corresponding to the left front tire 118 (block 606). For example, if the at least one indication of the tread wear determined as described with respect to block 604 includes three indications of the tread wear (e.g., indications of measurements of tread depths of three different portions of the left front tire 118), at least one of the three such indications of tread wear may be analyzed based on the tread wear data. As discussed below, analyzing an indication of tread wear based on the tread wear data corresponding to the left front tire 118 may include determining whether the indication of tread wear is or includes a measurement of tread depth that is less than a minimum sufficient tread depth of the left front tire 118.

As discussed elsewhere herein, the left front tire 118 may be of a particular type, where in some embodiments the particular type of the left front tire 118 may be a brand of the left front tire 118 and/or a name of a provider of tires that are of the particular type of the left front tire 118. For example, the provider of the tires that are of the particular type of the left front tire 118 may be an entity that sells or otherwise provides tires that are of the same brand as the left front tire 118. More particularly, the provider of the tires that are of the particular type of the left front tire 118 may be a manufacturer of the brand of the left front tire 118.

With continued reference to the actions described with respect to block 606, in various embodiments, the tread wear data corresponding to the left front tire 118 may be made available to the one or more processors, and more particularly to the insured party tire quality application 216A, from the provider of tires of the particular type. For example, the tread wear data may be made available from the tire provider server 112 to the insured party tire quality application 216A stored on and/or executing on the user computing device 104 via the computer network 106. In some embodiments, and as further discussed below with respect to FIG. 7, the tread wear data may be made available from the tire provider server 112 to the one or more processors in response to the one or more processors receiving data indicating the particular type of the left front tire 118. The data indicating the particular type of the left front tire 118 may be or may include identifying information of the tire located on or in the left front tire 118 when the left front tire 118 is obtained (e.g., purchased as a replacement tire) for the vehicle 102, such as identifying information contained in the bar code 126 that may be captured by the image sensor (e.g., the camera 105).

In other embodiments, the data indicating the particular type of the left front tire 118 may also or alternatively be or include identifying information of the left front tire 118 that is made available to a user of the user computing device 104 (e.g., a purchaser of the left front tire 118) when the left front tire 118 is obtained (e.g., as a replacement tire) for the vehicle 102. For example, such identifying information may be provided in writing to the user and manually input into the insured party tire quality application 216A; may be made available from the tire provider server 112 to the user computing device 104; and/or may be made available to the user in any other suitable manner, where the bar code 126 need not be present in these and other embodiments in which identifying information of the left front tire 118 is not obtained from the bar code 126. In still other embodiments, the data indicating the particular type of the left front tire 118 may additionally or alternatively be made available to the user computing device 104 by a seller of the vehicle 102, such as, for example, when the vehicle 102 is purchased. Thus, in some examples, the data indicating the particular type of the left front tire 118 may be provided to the user computing device 104 from the dealer server 116 via the computer network 106.

With further reference to the actions described with respect to block 606, the tread wear data corresponding to the left front tire 118 may include any suitable data corresponding to the left front tire 118 such as, for example, data indicating a minimum sufficient tread depth of the particular type of the left front tire 118 (e.g., such that if any portion of the tread of the left front tire 118 has a tread depth less than the minimum sufficient tread depth of the left front tire 118, the left front tire 118 is determined to have insufficient tread using the functionality described herein). In addition to data indicating a minimum sufficient tread depth of the left front tire 118, when the tread wear data corresponding to the left front tire 118 is made available to the one or more processors, any other suitable and/or desired data may also be made available from the tire provider server 112, such as but not limited to a minimum sufficient tire pressure of the left front tire 118. In some cases, additional portions (or all) of a manufacturer specification for the particular type of the left front tire 118 may be made available from the tire provider server 112 to the one or more processors. A user of, for example, the insured party tire quality application 216A may view such other data (e.g., minimum sufficient tire pressure data) and use such data to, for example, perform a check of tire pressure of the left front tire 118 in addition to the example system 100 providing the functionality described herein.

The one or more processors may identify, based on the analyzing of the at least one of the at least one indication of the tread wear of the left front tire 118, whether the tread of the left front tire 118 is insufficient (block 608). For example, as discussed above, analyzing an indication of tread wear (e.g., a measurement of a tread depth of a portion of the tread) based on the tread wear data corresponding to the left front tire 118 may include determining whether the measurement of tread depth of the portion of the tread is less than a minimum sufficient tread depth of the particular type of the left front tire 118 as indicated by the tread wear data. With further reference to the discussion above, if the analyzing of any one or more of the at least one of the at least one indication of the tread wear indicates a tread depth less than the minimum sufficient tread depth of the particular type of the left front tire 118, the tread of the left front tire 118 may be identified as insufficient.

As will be apparent from the above description, and as should be appreciated with respect to all examples presented in this disclosure, various ones of the functions or operations shown in FIG. 6 are optional. Furthermore, the functions or operations shown in FIG. 6 (and each flow chart herein) may be performed in any suitable order, any desired number of times, and/or with any suitable variation to the particular order and/or combination shown so as to achieve a desired result, such as a desired manner of using image data to determine tire quality.

Figure 7:
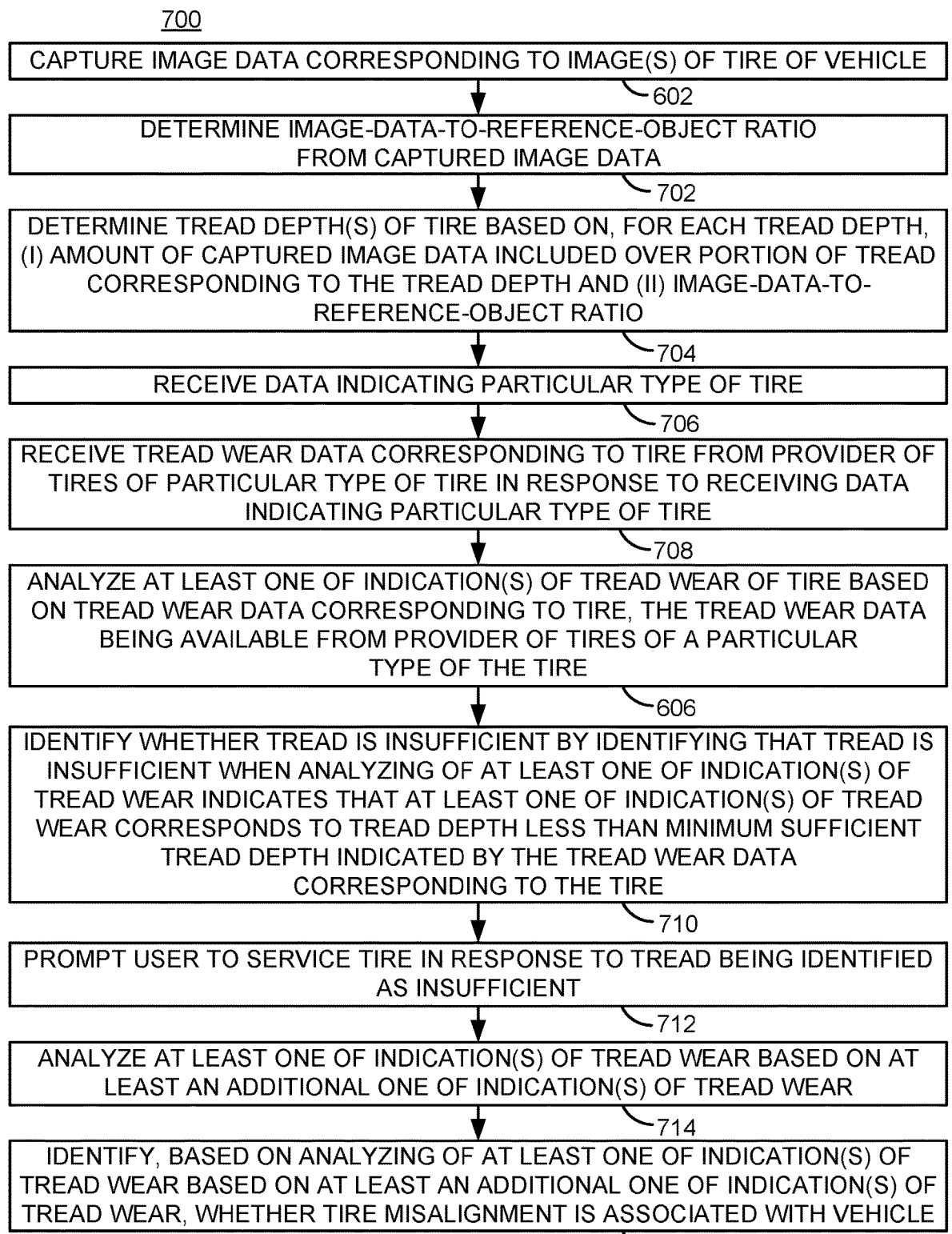
FIG. 7 is a flow chart of another example method, routine, or process for using image data to determine tire quality.

FIG. 7 is a flow chart of another example method, routine, or process 700 for using image data to determine tire quality. As will be appreciated in light of the following discussion, aspects of the example method, routine, or process 700 may correspond to a more detailed implementation(s) of aspects of the example method, routine, or process 600, and may include additional actions relative to those described with respect to the example method, routine, or process 600. Moreover, as with the example method, routine, or process 600, various actions described with reference to the example method, routine, or process 700 are described with respect to the left front tire 118. However, it will be appreciated in light of the teaching and disclosure herein that the description of such actions may also or alternatively be with respect to any other suitable tire(s) (e.g., the left rear tire 120), and similarly that performance of such actions may also or alternatively be with respect to any other suitable tire(s).

Image data corresponding to at least one image of the left front tire 118 of the vehicle 102 may be captured using an image sensor so as to perform the actions described above with respect to block 602. One or more processors, which may be one or more processors of the user computing device 104, may determine an image-data-to-reference-object ratio between (i) an amount of the image data included over a predetermined measurement of a reference object (e.g., the reference object 300) within one of the at least one image of the left front tire 118 and (ii) the predetermined measurement of the reference object 300 (block 702). In some embodiments, the image-data-to-reference-object ratio may be a pixel-to-diameter ratio that may be determined in the manner described above. Additionally or alternatively, the image data captured as described with respect to block 602 may correspond to multiple images, where one of the multiple images may be an image of the reference object 300 placed in a groove (e.g., the groove 302) of the left front tire 118 or sufficiently near but outside of the left front tire 118 in order to allow the actions described in detail above to be performed to determine the image-data-to-reference-object ratio.

The one or more processors may determine a tread depth(s) of the left front tire 118 (e.g., the depth of the first portion 304, the depth of the second portion 306, etc.) based on, for each one of the tread depth(s) to be determined, (i) an amount of the captured image data included over a portion of the tread that corresponds to the one tread depth and (ii) the image-data-to-reference-object ratio (block 704). For example, for the depth of the first portion 304 of the tread, the one or more processors may perform operations similar to those described above with respect to, for example, FIG. 4, to determine the second measurement 402 (which as noted above may be a measurement of the depth of the first portion 304 of the tread). It will be appreciated in light of the teaching and disclosure herein that the actions described with respect to block 704 may be performed as part of the processing of the captured image data to determine the at least one indication of the tread wear of the left front tire 118. It will be further appreciated in light of the teaching and disclosure herein that the actions described with respect to blocks 702 and 704 may constitute at least some of the actions described with respect to block 604 of the example method, routine, or process 600.

The one or more processors may receive data indicating the particular type of the left front tire 118, with examples of such data being described above (block 706). For example, a user of the insured party tire quality application 216A may input the particular type of the left front tire 118 into a suitable input field provided by the insured party tire quality application 216A; data indicating the particular type of the left front tire 118 may be auto-populated in such an input field or otherwise provided to the insured party tire quality application 216A in response to processing of image data corresponding to the bar code 126; etc.

The one or more processors may receive the tread wear data corresponding to the left front tire 118 from the provider of tires of the particular type of the left front tire 118 (e.g., from the tire provider server 112) in response to the one or more processors receiving the data indicating the particular type of the left front tire 118 (block 708). The tread wear data, and examples of particular information that may be included within the tread wear data, are further described above.

The one or more processors may perform the actions described with respect to block 606 to analyze at least one of the at least one indication of the tread wear based on the tread wear data corresponding to the left front tire 118, as further described above. The one or more processors may identify whether the tread of the left front tire 118 is insufficient by identifying that the tread is insufficient when the analyzing of the at least one of the at least one indication of the tread wear as described with respect to block 606 indicates that at least one of the at least one indication of the tread wear (e.g., the second measurement 402) corresponds to a tread depth that is less than the minimum sufficient tread depth indicated by the tread wear data corresponding to the left front tire 118 (block 710). Thus, where the second measurement 402 corresponds to a depth of the first portion 304 of the tread, such as described with respect to FIG. 4, and the depth of the first portion 304 of the tread is less than the minimum sufficient tread depth, the one or more processors may identify that, for example, the tread of the left front tire 118 as a whole is insufficient. It will be appreciated in light of the teaching and disclosure herein that the actions described with respect to block 710 may constitute at least some of the actions described with respect to block 608 of the example method, routine, or process 600.

The one or more processors may prompt, or be used in prompting (e.g., may cause the insured party tire quality application 216A to prompt), a user of the user computing device 104 to service the left front tire 118 (and/or other suitable tire(s), as discussed above) in response to the tread of the left front tire 118 being identified as insufficient (block 712). For example, the user may be prompted to have the left front tire 118 and/or one or more other tires of the vehicle 102 replaced. In some embodiments, the insured party tire quality application 216A may send an indication of the insufficient tread of the left front tire 118 to the vehicle service provider server 114 (such as with prior affirmative consent and/or opt-in from the user, which consent and/or opt-in may be received at the insurance provider server 108) so that a representative of a vehicle service provider (e.g., repair shop, dealership, etc.) may contact the user. In other embodiments, the insured party tire quality application 216A may additionally or alternatively provide the user with contact information to contact the vehicle service provider, such as but not limited to a website of the vehicle service provider that may be hosted by the vehicle service provider server 114, so that the user may schedule appropriate servicing of the left front tire 118 and/or one or more other tires of the vehicle 102.

The one or more processors may analyze at least one of the at least one indication of the tread wear (e.g., at least one tread depth measurement, such as the second measurement 402 of the depth of the first portion 304 of the tread) based on at least an additional one of the at least one indication of the tread wear (e.g., at least another tread depth measurement, such as a further measurement of the depth of the second portion 306 of the tread, as described above) (block 714). In one example, the one or more processors may determine a difference between the second measurement 402 of the depth of the first portion 304 and the further measurement of the depth of the second portion 306, and/or may determine such a difference at different times. In another example, the at least the additional one of the at least one indication of the tread wear may be a tread depth measurement of the same portion of the tread (e.g., the first portion 304). In this example, the analyzing of the at least one of the at least one indication of the tread wear based on the at least the additional one of the at least one indication of the tread wear may be or may include determining a difference between the second measurement 402 at a first time and the second measurement 402 at a second time.

The one or more processors may identify, based on the analyzing described with respect to block 714, whether a tire misalignment is associated with the vehicle 102 (block 716). For example, and as discussed elsewhere herein, if the one or more processors identify (such as via execution of the insured party tire quality application 216A) that the second measurement 402 of the depth of the first portion 304 of tread differs from the further measurement of the depth of the second portion 306 of tread by at least a threshold or predetermined amount (which may or may not be user-specified or specified by the insurance provider), a tire misalignment may be identified. As another example, if the difference between the second measurement 402 of the depth of the first portion 304 and the further measurement of the depth of the second portion 306 changes by at least a threshold or predetermined amount over time (e.g., over a threshold or predetermined amount of time), and/or changes at at least a threshold or predetermined rate, a tire misalignment may be identified. As discussed above, FIG. 5 also illustrates a third portion 500 of tread, and any suitable difference between tread depths may be evaluated (such as a difference between a depth of the third portion 500 and a depth of the second portion 306 as discussed with respect to FIG. 5) as described herein to identify a tire misalignment. As yet another example, if the second measurement 402 (or, in various examples, any other measurement of tread depth) changes by at least a threshold or predetermined amount over time (e.g., over a threshold or predetermined amount of time), and/or changes at at least a threshold or predetermined rate, indicating rapid wear of the first portion 304 of the tread, a tire misalignment may be identified.

In various embodiments, to facilitate accurate image processing and resultant measurements of tread depth (e.g., accuracy of the second measurement 402 of the depth of the first portion 304 of the tread, the further measurement of the depth of the second portion 306 of the tread, and/or a measurement of the depth of the third portion 500 of the tread, etc.), the aforementioned instructions and/or guide may direct a user to capture the image data as described with respect to block 602 with the image sensor (e.g., the camera 105) and/or the reference object 300 positioned at or near, and/or focused on or near, for example, a top of the left front wheel well 122. Additionally or alternatively, in some embodiments, multiple images of the left front tire 118 may be taken to assist in determining different tread depth measurements as described herein, and the insured party tire quality application 216A may direct a user thereof to take such multiple images and may instruct and/or guide the user regarding positioning for such multiple images in a similar manner to the instructions and/or guiding functionality discussed above. Furthermore, in some embodiments, the user may additionally or alternatively be prompted (e.g., by the insured party tire quality application 216A) to capture such multiple images focusing on different portions of the tread upon identification of a tire misalignment based on, for example, a difference in tread depths between such portions of tread. Still further, in some embodiments, the user may additionally or alternatively be prompted (e.g., by the insured party tire quality application 216A) to make an appointment to correct an identified tire misalignment, such as by making an appointment through a website of a vehicle service provider that may be hosted by the vehicle service provider server 114.

Accordingly, with the functionality described herein, a user of the user computing device 104 may, for example, operate the user computing device 104 (e.g., via execution of the insured party tire quality application 216A) to capture image data so as to identify whether tread of a tire of a vehicle (e.g., tread of the left front tire 118 of the vehicle 102) is insufficient by use of, inter alia, tread wear data corresponding to the particular type of the tire that may be made available to the user computing device 104 by a provider of the particular type of the tire. The captured image data may also or alternatively be used to identify whether a tire misalignment is associated with the vehicle 102. In various embodiments, the user may, for example, use the functionality described herein to check whether tread of a tire (or tires) is insufficient and/or whether a tire misalignment is associated with the vehicle 102 before a storm such as a snowstorm; on a periodic basis (e.g., monthly or at any other desired interval); to verify an assessment made by a mechanic or other person or entity servicing the vehicle 102; and/or at any other suitable time and/or for any other suitable purpose.

The user may be, for example, a customer of an insurance provider (such as the insurance provider associated with the insurance provider server 108) and may opt-in or otherwise affirmatively consent to the captured image data being processed by an application (e.g., the insured party tire quality application 216A) made available to the user by the insurance provider. The user may also opt-in or otherwise affirmatively consent to data being communicated to, for example, the vehicle service provider server 114 and/or any other devices and/or entities as described herein. In some embodiments, the user may receive insurance discounts or other insurance cost savings with respect to, for example, insurance associated with the vehicle 102 based on the user having the functionality (e.g., having downloaded the insured party tire quality application 216A) described herein; based on an amount of use of the functionality described herein; based on a number of times and/or frequency that insufficient tread and/or a tire misalignment is identified using the functionality described herein over, for example, a particular time period; and/or based on any other suitable criteria.

V. Additional Considerations

The following additional considerations apply to the foregoing discussion. Throughout this specification, plural instances may implement functions, components, operations, or structures described as a single instance. As noted above, although individual functions and instructions of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The methods described in this application may include one or more functions or routines in the form of non-transitory computer-executable instructions that are stored in a tangible computer-readable storage medium and executed using a processor of a computing device (e.g., the user computing device 104, the insurance provider server 108, and/or any other computing devices within the example system 100 in any suitable combination). The routines may be included as part of any of the modules described in relation to FIG. 1 or as part of a module that is external to the system illustrated by FIG. 1. For example, the methods or portions thereof may be part of a browser application(s) or an application(s) running on any of the devices in the example system 100 as a plug-in or other module of the browser application. Further, the methods may be employed as "software-as-a-service" to provide, for example, the user computing device 104, the insurance provider server 108, and/or any other computing devices with access to the example system 100.

Additionally, certain aspects are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain functions). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules may provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and may operate on a resource (e.g., a collection of information).

The various operations of example functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or functions described herein may be at least partially processor-implemented. For example, at least some of the functions of a method may be performed by one or processors or processor-implemented hardware modules. The performance of certain of the functions may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Still further, the figures depict preferred embodiments of an example system 100 and methods for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and method for using image data to determine tire quality. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

To the extent that any meaning or definition of a term in this document conflicts with any meaning or definition of the same term in a document incorporated by reference, the meaning or definition assigned to that term in this document shall govern. Although the text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A computer-implemented method for identifying whether tread of a tire of a vehicle is insufficient, the method comprising:

capturing, using an image sensor, image data corresponding to a first image of the tire at a first time and a second image of the tire at a second time different from the first time, the image data including a reference object that obscures a portion of the tire and is comprised of an obscured portion and an unobscured portion;

processing, using one or more processors of a user computing device, the image data to:

determine an image-data-to-reference-object ratio by comparing the obscured portion or the unobscured portion to a measurement of the reference object, determine, based on the image-data-to-reference-object ratio, (i) a first tread wear difference in the first image by comparing a first indication of a first tread wear of the tire at a first location on the tire and a second indication of a second tread wear of the tire at a second location on the tire different from the first location, and (ii) a second tread wear difference in the second image by comparing a third indication of a third tread wear of the tire at the first location and a fourth indication of a fourth tread wear of the tire at the second location, and determine a tread wear rate of change by comparing the first tread wear difference to the second tread wear difference; and determining, using the one or more processors based on tread wear data corresponding to the tire, (i) whether the tread of the tire is insufficient by comparing at least one of the first indication, the second indication, the third indication, or the fourth indication to the tread wear data, and (ii) whether a tire misalignment is associated with the vehicle by comparing the tread wear rate of change to a tread wear rate of change threshold, wherein the tire is of a particular type, and wherein the tread wear data corresponding to the tire is available to the one or more processors of the user computing device from a provider of tires of the particular type.

2. The computer-implemented method of claim 1, further comprising receiving, using the one or more processors of the user computing device, the tread wear data corresponding to the tire from the provider of the tires of the particular type in response to receiving, using the one or more processors of the user computing device, data indicating the particular type of the tire.

3. The computer-implemented method of claim 2, wherein the data indicating the particular type of the tire includes at least one of identifying information of the tire located on or in the tire when the tire is obtained for the vehicle, identifying information of the tire made available to the user computing device when the tire is obtained for the vehicle, or identifying information of the tire made available to the user computing device by a seller of the vehicle.

4. The computer-implemented method of claim 1, wherein the tread wear data corresponding to the tire includes data indicating a minimum sufficient tread depth for the particular type of the tire, and wherein identifying whether the tread of the tire is insufficient includes identifying, using the one or more processors of the user computing device, that the tread of the tire is insufficient when any of the first indication, the second indication, the third indication, or the fourth indication corresponds to a tread depth that is less than the minimum sufficient tread depth.

5. The computer-implemented method of claim 1, wherein processing the image data to determine the first indication, the second indication, the third indication, and the fourth indication includes determining, using the one or more processors of the user computing device, at least one tread depth of the tire based on, for each one of the at least one tread depth, (i) an amount of the image data included over a portion of the tread of the tire that corresponds to the one tread depth and (ii) the image-data-to-reference-object ratio.

6. The computer-implemented method of claim 1, further comprising:
processing, using the one or more processors of the user computing device, the image data to determine, based on the image-data-to-reference-object ratio, at least one additional indication of the tread wear;
analyzing, using the one or more processors of the user computing device, at least one of the first indication, the second indication, the third indication, or the fourth indication based on at least one of the at least one additional indication of the tread wear; and
identifying, using the one or more processors of the user computing device, whether the tire misalignment is associated with the vehicle.

7. The computer-implemented method of claim 6, wherein:
capturing the image data corresponding to the at least one image of the tire includes capturing, using the image sensor, image data corresponding to a plurality of images of the tire at three or more different times;
processing the image data to determine the first indication, the second indication, the third indication, and the fourth indication includes processing, using the one or more processors of the user computing device, the image data to determine a plurality of indications of the tread wear of the tire at the three or more different times; and
identifying whether the tire misalignment is associated with the vehicle includes identifying, using the one or more processors of the user computing device, based on analyzing of the plurality of indications of the tread wear of the tire at the three or more different times, whether the tire misalignment is associated with the vehicle.

8. The computer-implemented method of claim 1, further comprising prompting, using the one or more processors of the user computing device, a user of the user computing device to service the tire in response to the tread of the tire being identified as insufficient.

9. The computer-implemented method of claim 1, wherein the particular type of the tire is one of at least one of a brand of the tire or a name of the provider of tires of the particular type.

10. A computing device for identifying whether tread of a tire of a vehicle is insufficient, the computing device comprising:
an image sensor configured to capture image data corresponding to a first image of the tire at a first time and a second image of the tire at a second time different from the first time, the image data including a reference object that obscures a portion of the tire and is comprised of an obscured portion and an unobscured portion;
one or more processors; and
one or more memories coupled to the one or more processors,
the one or more memories including non-transitory computer executable instructions stored therein that, when executed by the one or more processors, cause the one or more processors to:
process the image data to:
determine an image-data-to-reference-object ratio by comparing the obscured portion or the unobscured portion to a measurement of the reference object,
determine, based on the image-data-to-reference-object ratio, (i) a first tread wear difference in the first image by comparing a first indication of a first tread wear of the tire at a first location on the tire and a second indication of a second tread wear of the tire at a second location on the tire different from the first location, and (ii) a second tread wear difference in the second image by comparing a third indication of a third tread wear of the tire at the first location and a fourth indication of a fourth tread wear of the tire at the second location, and
determine a tread wear rate of change by comparing the first tread wear difference to the second tread wear difference,
determine, based on tread wear data corresponding to the tire, (i) whether the tread of the tire is insufficient by comparing at least one of the first indication, the second indication, the third indication, or the fourth indication to the tread wear data, and (ii) whether a tire misalignment is associated with the vehicle by comparing the tread wear rate of change to a tread wear rate of change threshold, wherein the tire is of a particular type, and wherein the tread wear data corresponding to the tire is available to the one or more processors of the user computing device from a provider of tires of the particular type.

11. The computing device of claim 10, the one or more memories further including non-transitory computer executable instructions that when executed cause the one or more processors to receive the tread wear data corresponding to the tire from the provider of the tires of the particular type in response to receiving data indicating the particular type of the tire.

12. The computing device of claim 10, wherein the tread wear data corresponding to the tire includes data indicating a minimum sufficient tread depth for the particular type of the tire, the one or more memories further including non-transitory computer executable instructions that when executed cause the one or more processors to identify that the tread of the tire is insufficient when any of the first indication, the second indication, the third indication, or the fourth indication corresponds to a tread depth that is less than the minimum sufficient tread depth.

13. The computing device of claim 10, the one or more memories further including non-transitory computer executable instructions that when executed cause the one or more processors to:
    determine at least one tread depth of the tire based on, for each one of the at least one tread depth, (i) an amount of the image data included over a portion of the tread of the tire that corresponds to the one tread depth and (ii) the image-data-to-reference-object ratio.

14. The computing device of claim 10, the one or more memories further including non-transitory computer executable instructions that when executed cause the one or more processors to:
    process the image data to determine, based on the image-data-to-reference-object ratio, at least one additional indication of the tread wear;
    analyze at least one of the first indication, the second indication, the third indication, or the fourth indication based on at least one of the at least one additional indication of the tread wear; and
    identify whether the tire misalignment is associated with the vehicle.

15. A computer readable storage medium comprising non-transitory computer readable instructions stored thereon for identifying whether tread of a tire of a vehicle is insufficient, wherein the instructions when executed by one or more computing devices cause the one or more computing devices to:
    capture, using an image sensor, image data corresponding to a first image of the tire at a first time and a second image of the tire at a second time different from the first time, the image data including a reference object that obscures a portion of the tire and is comprised of an obscured portion and an unobscured portion;
    process the image data to:
        determine an image-data-to-reference-object ratio by comparing the obscured portion or the unobscured portion to a measurement of the reference object,
        determine, based on the image-data-to-reference-object ratio, (i) a first tread wear difference in the first image by comparing a first indication of a first tread wear of the tire at a first location on the tire and a second indication of a second tread wear of the tire at a second location on the tire different from the first location, and (ii) a second tread wear difference in the second image by comparing a third indication of a third tread wear of the tire at the first location and a fourth indication of a fourth tread wear of the tire at the second location, and
    determine, based on tread wear data corresponding to the tire, (i) whether the tread of the tire is insufficient by comparing at least one of the first indication, the second indication, the third indication, or the fourth indication to the tread wear data, and (ii) whether a tire misalignment is associated with the vehicle by comparing the tread wear rate of change to a tread wear rate of change threshold, wherein the tire is of a particular type, and wherein the tread wear data corresponding to the tire is available to the one or more processors of the user computing device from a provider of tires of the particular type.

16. The computer readable storage medium of claim 15, further comprising non-transitory computer readable instructions stored thereon that when executed cause the one or more computing devices to receive the tread wear data corresponding to the tire from the provider of the tires of the particular type in response to receiving data indicating the particular type of the tire.

17. The computer readable storage medium of claim 15, wherein the tread wear data corresponding to the tire includes data indicating a minimum sufficient tread depth for the particular type of the tire, the computer readable storage medium further comprising non-transitory computer readable instructions stored thereon that when executed cause the one or more computing devices to identify that the tread of the tire is insufficient when any of the first indication, the second indication, the third indication, or the fourth indication corresponds to a tread depth that is less than the minimum sufficient tread depth.

18. The computer readable storage medium of claim 15, further comprising non-transitory computer readable instructions stored thereon that when executed cause the one or more computing devices to:
    determine at least one tread depth of the tire based on, for each one of the at least one tread depth, (i) an amount of the image data included over a portion of the tread of the tire that corresponds to the one tread depth and (ii) the image-data-to-reference-object ratio.

19. The computer readable storage medium of claim 15, further comprising non-transitory computer readable instructions stored thereon that when executed cause the one or more computing devices to:
    process the image data to determine, based on the image-data-to-reference-object ratio, an at least one additional indication of the tread wear;
    analyze at least one of the first indication, the second indication, the third indication, or the fourth indication based on at least one of the at least one additional indication of the tread wear; and
    identify whether the tire misalignment is associated with the vehicle.

\* \* \* \* \*